May 18, 1937.  E. B. THURSTON  2,080,842
SLOW SPEED REGULATION OF AN ELECTRIC MOTOR
Filed Feb. 28, 1934
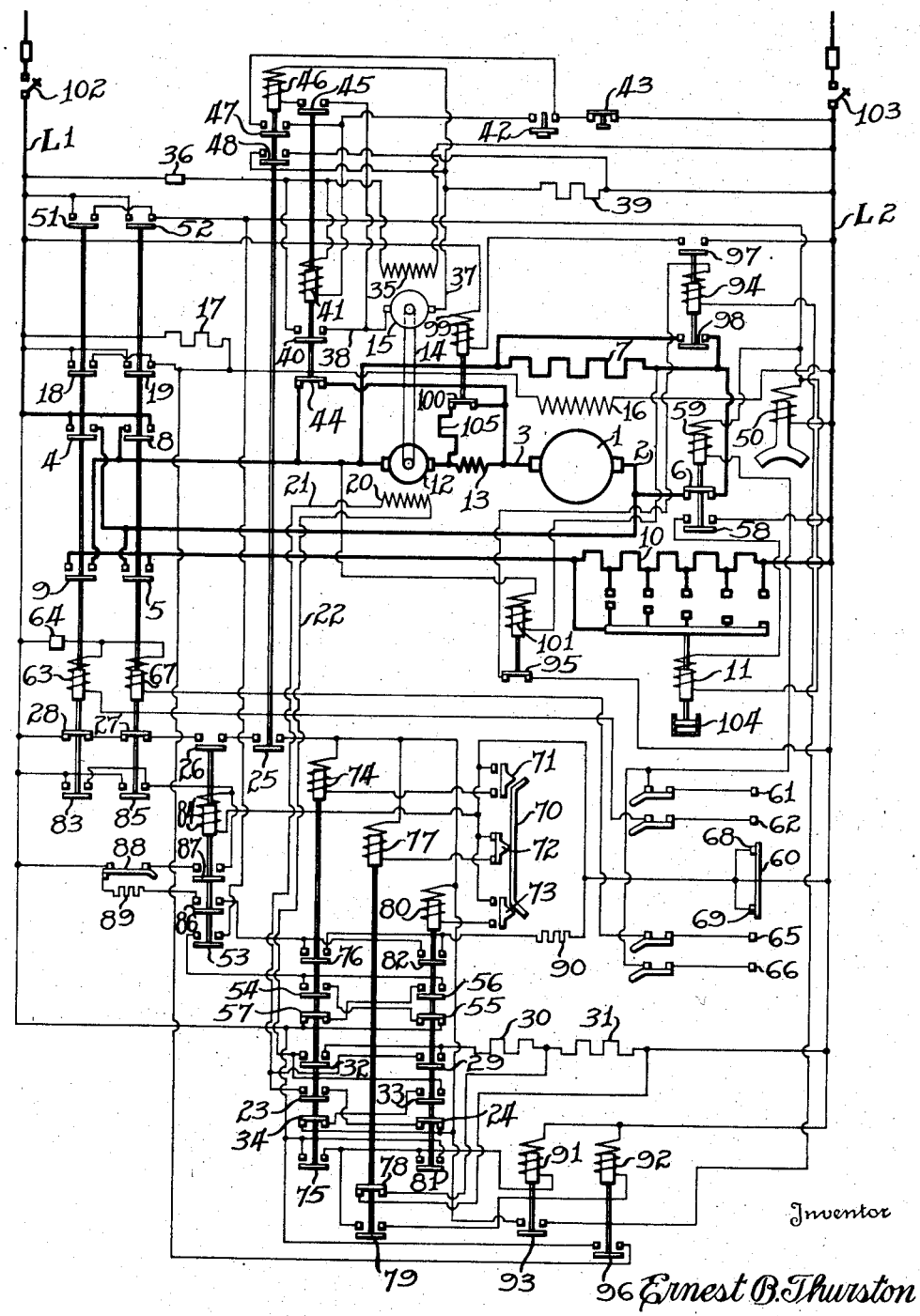
Inventor
Ernest B. Thurston
By Owen & Owen
Attorneys Patented May 18, 1937

2,080,842

UNITED STATES PATENT OFFICE 2,080,842

SLOW SPEED REGULATION OF AN ELECTRIC MOTOR

Ernest B. Thurston, Toledo, Ohio, assignor to The Haughton Elevator & Machine Company, Toledo, Ohio, a corporation of Ohio Application February 28, 1934, Serial No. 713,315

9 Claims. (Cl. 172—152)

This invention relates to imparting a slow speed to a direct current motor normally operating at relatively high speeds, and more particularly where the speed of the motor is normally regulated by the method commonly called "rheostatic control". In this type of control changes in the shunt field excitation may be utilized to some extent for speed control, but the lower speeds of such a motor are usually obtained and controlled by the use of resistance in series and in parallel with the armature of the motor.

Motor control of the type described is sufficient for some purposes, but does not give sufficiently accurate and positive control of relatively low speeds for satisfactory use in such operations as automatic leveling of a high speed elevator.

An object of this invention is to provide supplementary equipment for a motor of the type described to accurately and positively control relatively low speeds, for use in automatic leveling of high speed elevators or like operations, and to combine such supplementary equipment with the regular equipment so as to retain or introduce all necessary safety factors. A further object of the invention is to provide auxiliary equipment of the kind described and that can be utilized for equalizing the up and down speeds of an elevator under heavy load.

These and minor objects are attained by using a small generator of low voltage in combination with a motor with a common type of rheostatic control, with an arrangement of circuits, switches, and control and safety devices, which will appear as the description proceeds.

The accompanying drawing forming a part of this specification is a wiring diagram of one form of the invention applied to an elevator wiring system of a common type.

In this diagram L—1 and L—2 indicate the power lines. The main motor 1 is provided with leads 2 and 3. Lead 2 may be connected to power line L—1 through switch 4 or to power line L—2 through switch 5. It is also normally connected to lead 3 through switch 6 and resistance 7. Lead 3 may be connected to power line L—1, through switch 8 or to power line L—2 through switch 9.

Interposed in the connection from motor 1 to power line L—2 is the usual rheostat 10 which may be operated as indicated diagrammatically by a coil 11, as will be more fully described later.

Interposed in lead line 3 is a generator 12, and a portion of its field 13 is wound in series with the armature of the generator. Generator 12 is driven by a connection 14 from a motor 15 which is normally in continuous operation during the operation of the elevator.

Field 16 of motor 1 is constantly connected to power line L—2 and to power line L—1 through resistance 17. There is also a line which may be closed by switch 18 or switch 19 to cut out resistance 17.

Field 20 of generator 12 has leads 21 and 22. Lead 21 may be connected to power line L—1 through switches 23, 24, 25, 26, 27 and 28, or to power line L—2 through switch 29 and resistances 30 and 31. Lead 22 may be connected to power line L—2 through switch 32 and resistances 30 and 31, or the power line L—1 through switches 33 and 34, and 25, 26, 27 and 28, previously mentioned.

Field 35 of motor 15 is constantly connected to power line L—1 through a safety fuse 36. It is also constantly connected to power line L—2.

Motor 15 is provided with lead lines 37 and 38. Lead 37 is constantly connected to power line L—2 through resistance 39, and lead 38 may be connected to line L—1 through switch 40 and safety fuse 36.

Switch 40 is closed by energizing a coil 41 through pushing button 42 and thereby completing a circuit through the coil from the power lines when switch 43 is closed.

Connected to operate with switch 40 are switches 44 and 45. Switch 44 closes a shunt circuit for lead 3 cutting out generator 12 when switch 40 is open, but opens this shunt circuit when switch 40 is closed. It will be seen, therefore, that when lead line 38 of motor 15 is not connected to the power line, current is shunted around generator 12, but when switch 40 is closed so that motor 15 is in operation, current through line 3 passes through the armature and normally through a portion of the field of generator 12. Switch 45 opens and closes simultaneously with switch 40. When switch 45 closes, it completes a circuit from line 37 through coil 46 to line 38. When coil 46 is energized, it closes switch 25, previously mentioned, and switches 47 and 48. Switch 47 closes a circuit from coil 41 to power line L—2, cutting out push button switch 42 so that the circuit remains closed as long as switches 45 and 40 remain closed.

Switch 48 closes a shunt circuit around resistance 39 and so provides a direct line from power line L—2 to lead 37 when switch 48 is closed. It will be seen that this provides for the starting of motor 15 by pushing button 42 and the continuance of the operation of motor 15 until the switch 43 is opened temporarily.

Opening switch 43, of course, cuts off the connection through coil 41 which results in the opening of switches 40, 44 and 45 and, as a result, opening the circuit through coil 46 and thereby opening switches 47, 48 and 25, to remain open until motor 15 is again started in the manner described above.

The usual brake operating coil 50 is provided having one lead constantly connected to line L—2. The other lead is provided with a number of branches. One of these branches may be connected to power line L—1 through switch 51 or switch 52. A branch from this same branch may be connected to power line L—1 through switches 53, 54 and 55 or through switches 53, 56 and 57. Another branch may be connected to power line L—1 through coil 11, previously described, and switch 58 which is connected to be operated in alternation with switch 6 by means of a coil 59. Coil 59 is connected in still another branch from the brake lead line which may be connected to the power line L—1 through the car switch 60, when the car switch is moved in the up direction to bridge contacts 61 and 62 and so close the circuit to contact 62 and through coil 63 and the usual safety devices 64 to power line L—1. 64 indicates diagrammatically any customary or usual safety devices such as over-travel, emergency, over-speed, door switches, etc.

The same branch through coil 59 may be connected to power line L—1 in a similar manner when the car switch is moved down to bridge contacts 65 and 66 and close the circuit to contact 65 which leads to line L—1 through coil 67 and safety devices 64, previously mentioned.

When car switch 60 is moved to the position so that it bridges contacts 62 and 68, direct connection is made from contact 68 and line L—2 to contact 62 and through coil 63 to line L—1 and, likewise, when the car switch is moved downward to bridge contacts 65 and 69, direct connection is made from line L—2 through contact 69 to contact 65 and through coil 67 to line L—1.

For automatic leveling there may be provided any desired arrangement for controlling the switch for providing upward or downward leveling movement. For purposes of this description there is indicated a stationary cam 70 with respect to which switches 71, 72 and 73 are moved in accordance with the position of the car. In the drawing these switches are shown in the leveled condition, but for purposes of description, it will be supposed that initially switch 71 is closed by contact with cam 70 and that switches 72 and 73 are open. It will be seen that switch 71, when closed, completes a circuit from line L—2 through coil 74 and switches 25, 26, 27 and 28 to line L—1. Coil 74, when energized, opens switches 34 and 57 normally closed, and closes switches 23, 32 and 54, previously described, and also closes switches 75 and 76 to be mentioned later.

When switch 72 is closed, it completes a circuit from power line L—2 through coil 77 and switches 25, 26, 27 and 28 to power line L—1. The energizing of coil 77 opens switch 78 and closes switch 79, to be discussed later.

The closing of switch 73 completes the circuit from power line L—2 through coil 80 and switches 25, 26, 27 and 28 to line L—1. The energizing of coil 80 opens the normally closed switches 24 and 55 and closes switches 33, 29 and 56, previously mentioned, and switches 81 and 82, to be described later.

When coil 63 is energized, it closes switches 4, 9, 18, 51 and 83 while opening switch 28. When switch 83 is closed, it closes connection between one end of coil 84 and power line L—1. The other end of coil 84 is constantly connected to power line L—2.

When coil 67 is energized it opens switch 27 and closes switches 5, 8, 19, 52 and 85. When switch 85 is closed, it closes the same circuit as described in connection with switch 83, and thereby energizes coil 84.

When coil 84 is energized, it closes switches 26 and 53, previously mentioned, and also switches 86 and 87. Switch 87 closes a circuit from coil 84 to power line L—1 through a thermostatic switch 88 and in this way maintains the coil energized after connection has been made through the closing of switch 83 or 85. When switch 86 is closed, it closes a line from power line L—1 through resistance 89 to switches 76 and 82 and, when either of these switches is closed, the line is completed to power line L—2 through resistance 90.

When switch 75 is closed by the energizing of coil 74, it completes a circuit from power line L—1 through coil 91 to line L—2 and, if switch 79 is closed, it completes a circuit also through coil 92 to power line L—1. When switch 81 is closed by the energizing of coil 80, it, in like manner, completes a circuit through coil 91 and, if switch 79 is closed, also completes a circuit through coil 92. The energizing of coil 91 closes switch 93 and this completes a circuit through switches 25, 26, 27 and 28 to line L—1 and through coil 94, and switch 95 to power line L—2. When coil 92 is energized, it closes switch 96, which completes a circuit from power line L—1 to power line L—2 through field 16 of motor 1.

When coil 94 is energized, it closes switches 97 and 98. Switch 97 completes the circuit through coil 99 to open switch 100. When switch 100 is closed, it provides a circuit cutting out field coil 13 from lead 3.

When switch 98 is closed, it provides a circuit cutting out resistance 7.

Switch 95 is operated by a coil 101 which is connected to lead line 3 beyond generator 12 and on the other side is connected to lead line 2 between switch 6 and resistance 7.

The operation of the device will be fairly apparent from the description of the connections, but may be summarized as follows:

When the elevator is to be operated, line switches 102 and 103 are closed to provide current to power lines L—1 and L—2. Then the elevator may be operated in the usual manner if desired. When the car switch is moved to its first up or down position, motor 1 is energized through resistance 10 and operates at low speed. When the car switch is moved to extreme up or down position, coil 11 is energized and cuts out resistance 10 gradually in time-controlled manner by a dash pot 104 or equivalent control, in the usual manner. Also, switch 6 is opened so as to cut out the shunt circuit through resistance 7.

Unless intentionally put in operation by push button 42, the auxiliary generator and leveling devices remain out of operation. Until coil 41 is energized, switch 44 remains closed, shunting the current around generator 12, and switch 40 remains open so that motor 15 is not operated. Likewise switch 25 remains open, so that the closing of switches 71, 72 and 73 is without effect, and the elevator operates just as though the supplementary equipment had not been provided.

When push button 42 is operated, coils 41 and 46 are energized and continue in that state until power is cut off by opening switch 43 or the power line switches. Accordingly switches 40 and 25 remain closed, motor 15 drives generator 12, switch 44 is open, and current passes through the armature of generator 12 in series with motor 1. Since switch 25 remains closed, the closing of switches 71, 72 and 73 is effectual whenever switches 26, 27 and 28 are closed.

Whenever either the up or down switch of the car is operated, coil 84 is energized through the closing of switch 83 or 85, switches 87 and 26 then close and remain closed until thermal switch 88 is opened. The operation of leveling switches 71, 72 and 73 is ineffectual as long as motor 1 is being operated by the car switch 60 in either the up or down direction, but when power is cut off from motor 1, both 27 and 28 are closed, so that the leveling switches become effectual.

Supposing the power is cut off from motor 1 with switch 71 closed by cam 70 but with switches 72 and 73 below that cam, as soon as both switches 27 and 28 are closed, coil 74 is energized, which in turn energizes field 20 by connecting line 21 to power line L—1 and line 22 to power line L—2. Since switch 78 remains closed, resistance 31 is cut out, and generator 12 exerts its maximum energy.

When car switch 60 is moved to stopping position, motor 1 is short circuited through resistance 7 and acts as a dynamic brake. When the car is slowed up sufficiently, the current through resistance 7 drops to a point where voltage relay 101, in parallel with resistance 7, closes switch 95, the circuit through coil 94 is closed, since switch 93 is closed as a result of the closing of switch 71. Therefore switches 97 and 98 are closed automatically, cutting out resistance 7 as soon as its function during dynamic braking has been performed. The closing of switch 97 energizes coil 99, opens switch 100 and directs full current through field coil 13. However, any standard timing device, not shown, may be provided to delay the opening of switch 100 after the closing of switch 97, where a delay in full power of generator 12 is desired.

It will be seen that the result of the described arrangement is to connect motor 1 in series with fully energized generator 12 and drive the motor in a direction to level the car.

When the car moves far enough to close switch 72, switch 78 is opened, cutting in resistance 31 and thereby decreasing the current delivered by generator 12. At the same time, switch 79 is closed, energizing coil 92, closing switch 96, and cutting out resistance 17, further decreasing the speed at which motor 1 is driven as the car approaches exact level. If the particular motor employed should render it desirable, switch 79 could be closed permanently so as to cut out resistance 17 for all leveling operations.

When the car reaches the correct position and switch 71 opens, power is at once cut off from field 20 of the generator 12, and at the same time opening of switch 54 disconnects the brake-opening magnet coil from line L—1 and results in the application of the brake. It will be readily understood that the closing of switch 54 through the energizing of coil 74 has prevented the application of the brake during the leveling operation.

It will be readily understood that leveling of the car takes place in a similar manner when it is stopped with switch 73 closed, the energizing of coil 80 resulting in connections similar to those described above, except for reversing the field of generator 12 so as to operate motor 1 in the opposite direction.

When generator 12 is operating to level the loaded car, field coil 13 operates to increase the current in the up direction and decrease the current in the down direction, in the well known manner, and is adjusted to substantially equalize the up and down leveling speeds.

Coil 99 can receive energy only when switch 93 is closed, and so switch 100 is closed except during leveling operations. The line closed by switch 100 may have such low resistance as to nullify the effect of the field coil 13 where motor 1 is of the geared type, or for any reason does not have a drooping characteristic, but with a motor 1, having a drooping characteristic, sufficient resistance 105 may be introduced in the line closed by switch 100 so that enough current passes through field coil 13, during the normal operation of motor 1 to supply from generator 12 the boosting or bucking effect necessary to substantially equalize the up and down speeds under load. Under some circumstances switch 100 and/or the line closed thereby could be omitted, but ordinarily it is desirable so as to adjust the boosting and bucking effect of field 13 to the different needs of leveling and normal operation respectively.

If leveling switch 71 or 73 remains closed abnormally long for any reason, the prolonged current through resistance 89, resulting from the retention of switch 76 or 82 in closed position, heats switch 88 so that it opens, thereby de-energizing coil 84, opening switch 26 and ending the leveling attempt, which is not repeated until after switch 88 has cooled sufficiently to close, and the car has been operated so as to excite coil 84.

The circuits for energizing field 20 of generator 12 and for freeing the brake by current through switch 53 etc., are each provided with one normally closed switch opened by the energizing of coil 74 or 80, and another normally open switch closed by the energizing of the other of the two coils mentioned. Accordingly the freeing of the brake and the energizing of generator 12 for leveling action are both dependent upon the alternate action of coils 74 and 80, and cannot take place with both 71 and 73 closed any more than with both open. This guards against continued movement of the car by the leveling apparatus past and materially beyond a floor because of the failure to open of the first-closed leveling switch.

Coils 91 and 92 are preferably constructed to provide a slight delay between the opening of their respective circuits and the closing of switch 93 or 96 respectively, in order to prevent the sudden cutting out and in of resistance 7 or 17 in case the car switch is moved to stopping position with the car approaching floor level so closely and rapidly that it passes floor level before it is stopped by the normal dynamic braking action. A cutting out and in of the resistance under such circumstances would result in an undesirable jerk on the car.

From the above it will be seen that there is provided a supplemental leveling apparatus which may be employed when desired and completely cut out whenever desired, so as to operate the elevator as though the leveling apparatus had not been provided. During the normal operation of the elevator, the supplemental motor may be inoperative or may be utilized to any desired extent to boost and buck the current through the motor to eliminate a drooping characteristic.

When connected for leveling action, the apparatus performs its function automatically under normal conditions, but is automatically cut out by failure to level the car in normal time, whatever may be the cause of that failure. This avoids any danger of driving the motor from its approximately correct position by continued action of the leveling apparatus due to sticking of leveling switches or any other cause.

While one arrangement of apparatus embodying the invention has been described in detail, it will be readily understood that various modifications may be made to suit the exigencies of different installations where similar relatively slow speed adjustment is required for a load normally moved at relatively high speed by a motor of the type described. Therefore the details of the described installation are not to be considered necessary features of the invention claimed except as introduced into the claims by a reasonable construction thereof.

What is claimed is:—

1. In combination, a main motor, means for connecting the motor to power lines, an auxiliary generator, an auxiliary motor connected to drive said generator, and means permanently connecting the generator in an operation of the main motor from the power lines and closing a shunt circuit for the main motor current around the generator when the auxiliary motor is de-energized.

2. In combination, a source of current, a main motor, means for connecting the motor with power lines from said source, a generator having its armature in series with the motor, means for connecting a portion of the field of the generator in series with its armature, and means for automatically shunting the current around said portion whenever the motor is connected to the power lines.

3. In elevator operating apparatus, a motor of the direct current rheostatic control type having resistances in series and in parallel with the armature for speed control, means to connect the motor to power lines for normal operation, a generator normally in series with the motor, a shunt circuit for the motor current around said generator, means for driving the generator, and means opening the shunt circuit while said driving means is operating.

4. In elevator operating apparatus, a motor of the direct current rheostatic control type having resistances in series and in parallel with the armature for speed control, means to connect the motor to power lines for normal operation, a generator for supplying the current to the motor during leveling operations, means shunting the motor circuit, through the resistance in parallel therewith and through the armature of the generator, when current from the power lines is cut off, and means to cut out the last said resistance when the current resulting from dynamic braking through said resistance drops to a predetermined extent.

5. In an elevator apparatus, a motor, means for connecting the motor to power lines for normal operation, a generator supplying the current to said motor for leveling, means connecting the motor, generator and resistance in series with each other when the motor is operated at low speed from the power lines, means energizing the generator to supply leveling current when connection with the power lines is opened with the elevator in leveling position, and means closing a shunt circuit around the resistance upon a predetermined drop in the current through the resistance.

6. In elevator operating apparatus, a motor, a brake, a circuit for providing current for up leveling, a circuit for providing current for down leveling, a circuit for providing current for releasing the brake during leveling, and a time switch opening all of said circuits when either leveling circuit remains closed beyond a limited time.

7. Apparatus as claimed in claim 6 and provided with means for maintaining said circuits open after they have been opened by said time switch until the car has been operated normally in either the up or down direction.

8. In elevator operating apparatus, a motor having a drooping characteristic at high speed, means to connect the motor with power lines for normal operation, a generator for supplying current to the motor for leveling operations, and means connecting the armature of the generator and a portion of the field thereof in series with the motor constantly while the motor is driven.

9. In elevator operating apparatus, a motor having a drooping characteristic, means to connect the motor with power lines for normal operation, a generator for supplying current to the motor for leveling operations, and means connecting the armature of the generator and a portion of the field thereof in series with the motor, and means for determining the bucking and boosting effect of such series field during normal operation and means for determining the effect of said field during leveling independently of its effect during normal operation.

ERNEST B. THURSTON.